United States Patent [19]

Okajima

[11] 4,442,732
[45] Apr. 17, 1984

[54] PEDAL FOR A BICYCLE

[75] Inventor: Shinpei Okajima, Sakai, Japan

[73] Assignee: Shimano Industrial Company Limited, Osaka, Japan

[21] Appl. No.: 238,964

[22] Filed: Feb. 27, 1981

Related U.S. Application Data

[63] Continuation of Ser. No. 73,859, Sep. 10, 1979, abandoned.

[30] Foreign Application Priority Data

| Sep. 22, 1978 | [JP] | Japan | 53-130803 |
| Sep. 22, 1978 | [JP] | Japan | 53-130804 |
| Sep. 22, 1978 | [JP] | Japan | 53-130805 |
| Sep. 22, 1978 | [JP] | Japan | 53-130806 |
| Sep. 22, 1978 | [JP] | Japan | 53-130807 |

[51] Int. Cl.³ .............................. G05G 1/14
[52] U.S. Cl. .................. 74/594.5; 74/594.6; 74/594.7
[58] Field of Search ............ 74/560, 594.1, 594.4, 74/594.6, 594.7, 594.5; 308/23.5, 179.5, 191, 192

[56] References Cited

U.S. PATENT DOCUMENTS

| 3,827,107 | 8/1974 | Moore | 24/204 |
| 4,269,084 | 5/1981 | Okajima | 74/594.6 |

FOREIGN PATENT DOCUMENTS

| 1089653 | 9/1960 | Fed. Rep. of Germany | 74/594.4 |
| 2938126 | 4/1980 | Fed. Rep. of Germany | 74/594.1 |
| 482323 | 12/1916 | France | |
| 558880 | 9/1923 | France | 74/594.6 |
| 898926 | 7/1944 | France | |
| 920499 | 1/1947 | France | |
| 970293 | 6/1950 | France | |
| 1013908 | 8/1952 | France | 74/594.6 |
| 7539618 | 10/1976 | France | 74/560 |
| 434497 | 4/1948 | Italy | 74/594.1 |
| 63956 | 3/1922 | Japan | |
| 25-9727 | 11/1950 | Japan | |
| 5010416 | 5/1973 | Japan | |
| 51-101250 | 2/1975 | Japan | |

Primary Examiner—Kenneth Dorner
Attorney, Agent, or Firm—Stevens, Davis, Miller & Mosher

[57] ABSTRACT

A pedal for a bicycle, having a pedal body and a bearing mechanism for rotatably supporting the pedal body to a crank arm, the pedal body being equipped with a toe clip and a toe strap. The pedal body is displaced with respect to the bearing mechanism and the bearing mechanism comprises a bearing cylinder extending from the pedal body and having a threaded bore, a spindle screwable therewith, and a tubular member fixed to the crank arm, the spindle having at its outer periphery a first ball race, the bearing cylinder having at its outer periphery a second ball race larger in diameter than the first ball race, so that the bearing cylinder and spindle may be rotatably supported to the fixed tubular member through balls carried by the ball races.

6 Claims, 7 Drawing Figures

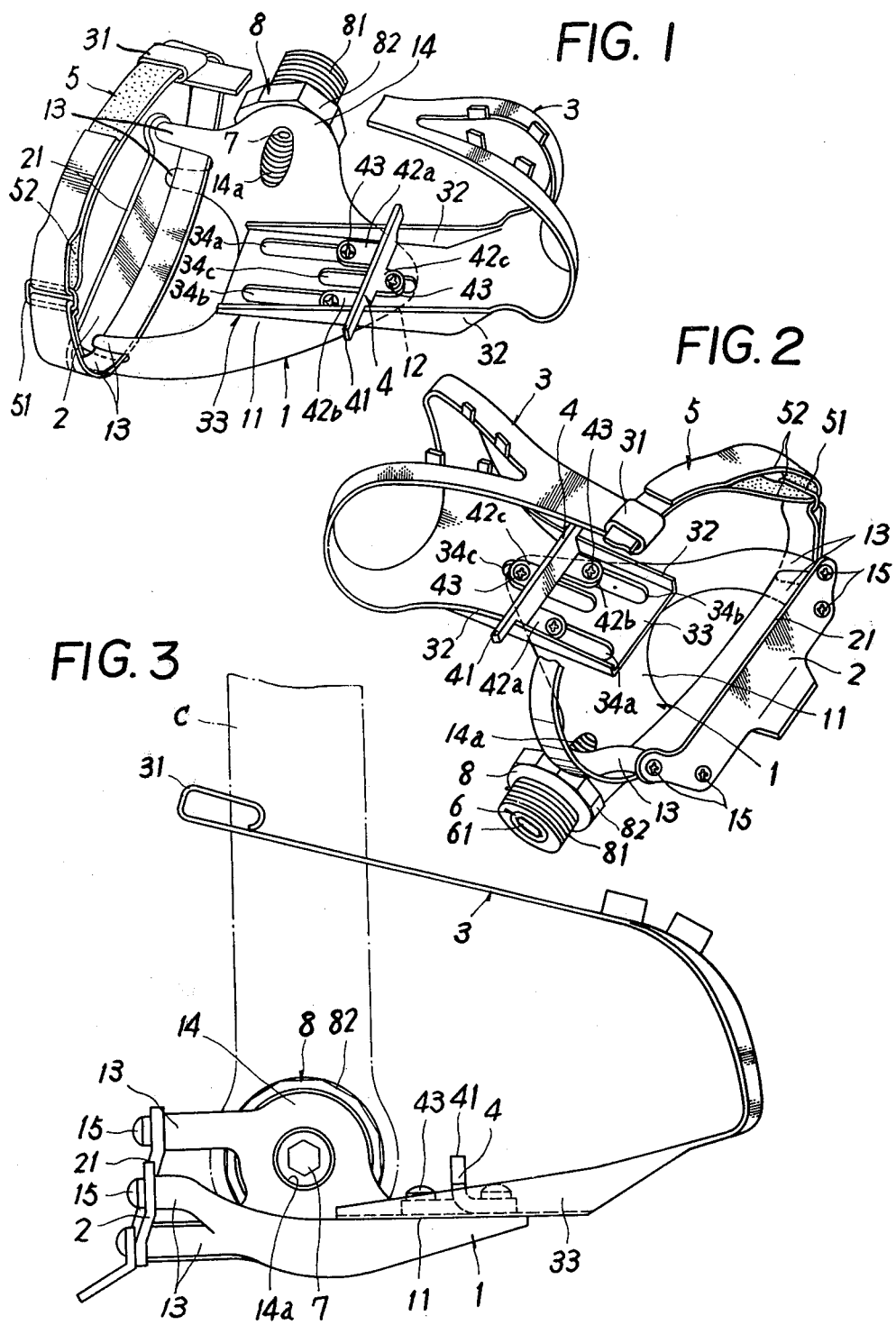

4,442,732

PEDAL FOR A BICYCLE

This is a continuation of application Ser. No. 73,859 filed Sept. 10, 1979, now abandoned.

BACKGROUND OF THE INVENTION

This invention relates to a pedal for a bicycle, and more particularly to a pedal for a bicycle, which has a pedal body and a bearing mechanism for supporting the pedal body to a crank arm, the body being equipped with a toe clip and a toe strap.

Generally, a bicycle, especially a racing bicycle, has pedal bodies provided with toe clips and toe straps so that a driver secures his shoes to the pedal bodies by means of the toe clips and toe straps and forcibly revolves the crank arms by raising the pedals as well as treading them. The pedal bodies are each displaced vertically with respect to a spindle and one-sided-supported to the crank arm, so that the centroid of the body is positioned under the axis of the spindle and the foot bearing surface is directed upwardly.

Since the pedal body is one-sided-supported to the crank arm, the bearing mechanism, when subjected to a greater unbalanced load, causes wear at its bearings or a bend at the spindle, resulting in a rough rotation of the pedal body after long use.

The toe clip, which is attached to the outer surface of a front side-plate at the pedal body, has a poor mounting stability and also is not adjustable in position especially longitudinally of the pedal body.

Furthermore, in the conventional pedal, the front sideplate which is attached to the pedal body and a front portion thereof are formed to extend approximately at right angles to the forward moving direction of the bicycle. Hence, air resistance against the pedal increases, which is a particular problem in racing bicycles.

SUMMARY OF THE INVENTION

This invention has been designed to solve the foregoing problems in a bicycle pedal, especially a pedal for use in a racing bicycle, which is provided with a toe clip and toe strap. A main object of the invention is to provide a bicycle pedal, in which, notwithstanding a pedal body is one-sided-supported to the crank arm, that the bearing construction of the pedal, even when subjected to a greater unbalanced load, causes no wear at its bearings and no bend at its spindle to thereby increase durability of the pedal. Another object of the invention is to provide a bicycle pedal, which ensures that the toe clip is mounted to the pedal body and can be adjusted in position longitudinally thereof. A further object of the invention is to provide a pedal subjected to less air resistance.

The bicycle pedal of the invention has a pedal body and a bearing mechanism for rotatably supporting the pedal body to the crank arm, the pedal body being provided with a toe clip and a toe strap. The pedal body is displaced vertically with respect to the bearing mechanism, and the bearing mechanism comprises a bearing cylinder extending from the pedal body and having a threaded bore, a spindle screwable therewith, and a tubular member fixed to the crank arm, the spindle being provided at the outer periphery thereof with a first ball race, the bearing cylinder being provided at the outer periphery thereof with a second ball race larger in diameter than the first ball race, so that balls carried by each of the ball races may rotatably support the bearing cylinder and spindle to the fixed tubular member. Hence, an unbalanced load applied to the bearing mechanism by way of the pedal body is dispersed onto the second larger diameter ball race, the balls carried therewith, and the fixed tubular member. In other words, the pedal body, which is supported at its larger diameter portion to the fixed tubular member, is able to disperse the unbalanced load as just described and prevent a greater local load from acting on the pedal body. As a result, the balls and ball races are less worn and the spindle hardly bends. Also, the use of a spindle screwably fixed to the bearing cylinder, the latter extending from the pedal body makes it possible to keep the durability thereof without requiring an increase in strength as by enlarging the spindle diameter or by selecting a harder material.

Furthermore, the pedal of the invention is so constructed that the pedal body extends at its front portion forward to form an extension of a substantially triangular shape. The extension is provided at its fore end with a front side-plate having a foot bearing surface and being arranged along the outside edge of the same to thereby reduce air resistance against the pedal body. Also, a flat surface is provided at the upper portion of pedal body stably and reliably support a toe clip, while enabling longitudinal adjustment of the toe clip.

These and other objects and novel features of the invention will be more apparent upon a reading of the following detailed specification and drawings.

BRIEF DESCRIPTION OF THE DRAWINGS

FIG. 1 is a partially omitted perspective view of an embodiment of a pedal of the invention, looking obliquely from the front, FIG. 2 is a partially omitted perspective view of the pedal in FIG. 1, looking obliquely from the back, FIG. 3 is a side view of the pedal, in which a toe strap is omitted.

DESCRIPTION OF THE PREFERRED EMBODIMENT

Figure 5:
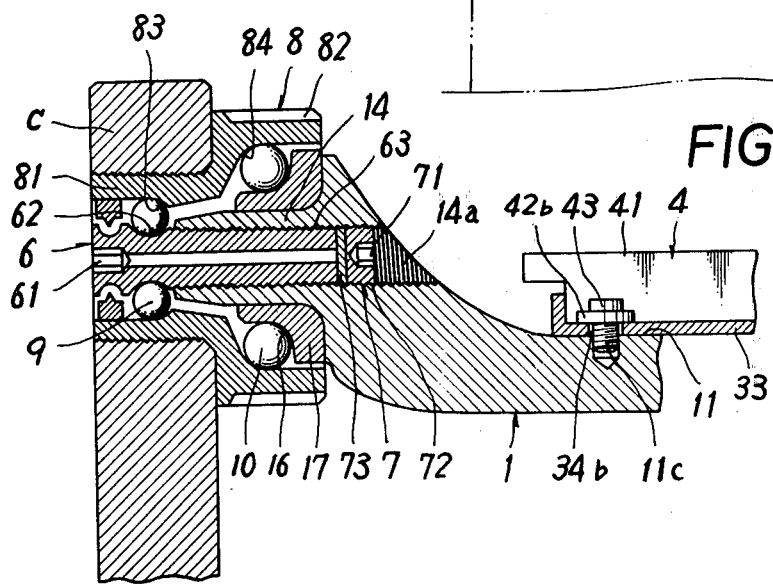
FIG. 5 is an enlarged sectional view of the principal portion thereof, FIG. 6 and 7 showing a modified embodiment.

Referring to the drawings, reference numeral 1 designates a pedal body made of an aluminum alloy. The pedal body 1 is provided at a substantially intermediate portion thereof with an flat upper surface 11, at the front side with an extension 12 of a triangular shape directed forward, the rear of both widthwise sides with four legs 13 extending rearward. Also, a bearing cylinder 14 having a threaded bore 14a is provided at one side of a longitudinally intermediate portion of pedal body 1 and shifted upwardly from the upper surface 11 thereof as shown in FIG. 5.

Figure 4:
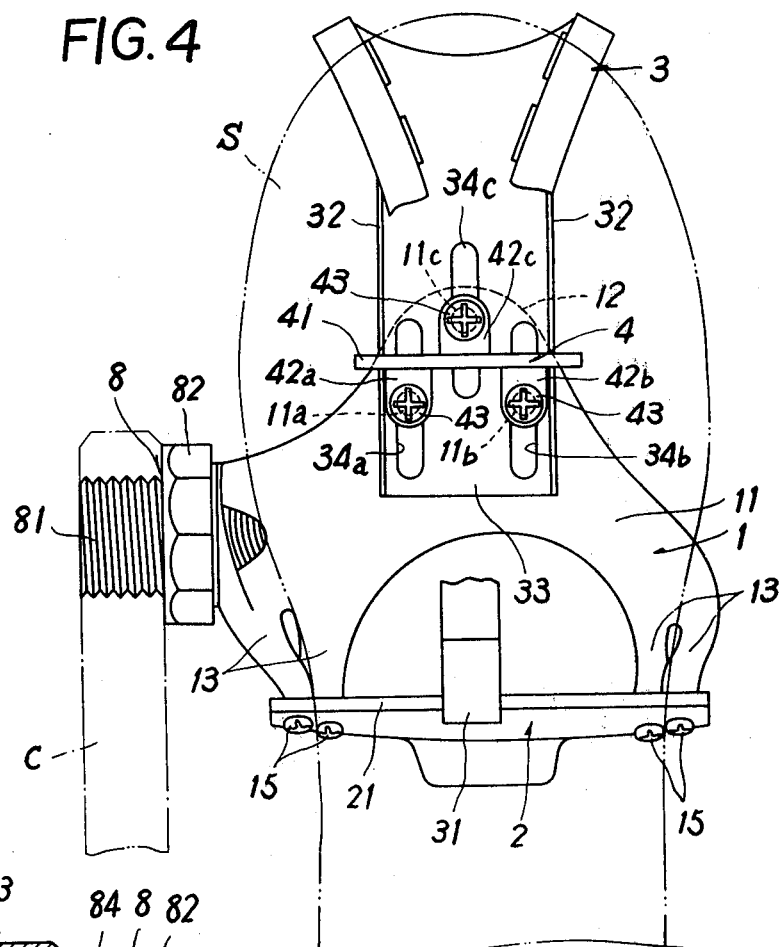
FIG. 4 is a plan view of the pedal.

At the upper flat surface 11 of pedal body 1 are provided three mounting bores 11a to 11c arranged at the centers thereof in an equilateral triangle as shown in FIG. 4. Through the bores 11a to 11c, the toe clip 3 is mounted onto the flat surface 11 and a front side-plate 4 having a foot bearing face 41 is attached to the front side of pedal body 1. A rear side-plate 2 with a foot bearing face 21 is mounted to the end of each leg 13 at the body 1 by means of screws 15. It is to be noted that the foot bearing faces 21 and 41 are approximately level with the axis of bearing cylinder 14.

The toe clip 3 is as a whole curved forward in a C-like shape and has at the rear end of an upper portion an engagement 31 through which the toe clip 3 is engaged with a toe strap 5 to be hereinafter described, and/at the rear end of a lower portion a mounting portion 33 extending horizontally. The mounting portion 33 has at both widthwise sides thereof rising walls 32 extending lengthwise of the same and at a substantially intermediate portion three parallel elongated slots 34a, 34b and 34c.

The toe clip 3 is mounted to the pedal body 1 in such a manner that the mounting portion 33 is placed on the flat surface 11 and the three screws 43 are projected through the slots 34a to 34c and screwed with the mounting bores 11a to 11c at the flat surface 11, whereby the toe clip 3 is movable longitudinally with respect to the screws 43 in a range of length of each of the slots 34a to 34c. As a result, the toe clip 3 is adjustable in position with respect to the pedal body 1.

In addition, when mounting tongues 42a and 42b extending rearwards at both sides of the lower portion of front side-plate 4 and that 42c extending forwards at the center, are integrated with the side-plate 4, the side-plate 4 can be mounted to the pedal body 1 simultaneously with mounting of the toe clip 3.

The toe strap 5 is mounted to the rear of pedal body 1 is, formed of a thin tape, and has at one lengthwise end a ring 51 and at the other end a detachable fastener 52. The end with the fastener 52 is inserted between each pair of legs 13 at the rear of pedal body 1 and through the engagement 31 at the toe clip 3 to thereby support the toe strap 5 thereto, and then is inserted through the ring 51 and turned to connect the fastener 52, thus holding tight the driver's shoe within the toe clip 3.

The pedal body 1 constructed as just described is rotatably supported to a crank arm C at the bicycle through a bearing mechanism to be hereinafter described.

The bearing mechanism is constructed such that a spindle 6 is screwed with the threaded bore 14a at the bearing cylinder 14 and fixed thereto by a lock nut 7, and the bearing cylinder 14 and spindle 6 are rotatably supported through pairs of balls 9 and 10 to a tubular member 8 fixed to the crank arm C. The spindle 6 serves to reinforce therewith the bearing cylinder 14 and is made mainly from a hard material, such as iron. The spindle 6, when screwed with the bearing cylinder 14, projects outwardly therefrom. A hexagonal control element 61 is provided at the spindle to projecting end face, a first ball race 62 is formed at the outer periphery of the spindle projecting end, and a screw thread 63 screwable with the threaded bore 14a is provided at the spindle outer periphery extending inward (rightward in FIG. 5) from the ball race 62 along the remaining length of spindle 6.

The lock nut 7, which has at its center a control element 71 and at the outer periphery a screw thread 72, is screwed with the threaded bore 14a at the inside thereof so as not to project beyond the pedal body 1 surface to fix the spindle 6 in position as shown in FIG. 5. A washer 73 is inserted between the lock nut 7 and the end face of spindle 6.

Onto the outer periphery of bearing cylinder 14 is pressfit a ring 17 having a second ball race 16 larger in diameter than the first ball race 62. The ring 17 is formed of a material, such as iron, having a hardness similar to that of spindle 6. In addition, when the pedal body 1 is formed of a hard material, such as iron, the ring 17 need not be provided, but as the second ball race 16 can be formed directly on the outer periphery of bearing cylinder 14.

The fixed tubular member 8 is formed mainly of iron and comprises a fixing portion 81 smaller in diameter than and screwably fixed to the crank arm C, and a mounting control element 82 larger in diameter than the fixing portion 81 and having a polygonal outer periphery. At the inner peripheries of fixing portion 81 and larger diameter mounting control element 82 are provided a first inner ball race 83 corresponding to the first ball race 62 and a second inner ball race 84 corresponding to the second ball race 16 respectively. Between the ball races 62 and 83 are inserted balls 9 and between the ball races 16 and 84 are inserted balls 10, so that the fixed tubular member 8 may rotatably support the spindle 6 and bearing cylinder 14.

In use, the pedal of the invention is attached to a bicycle by fixing portion 81 at the fixed tubular member 8 being screwably fixed to the crank arm C, a driver's shoe can be inserted within the toe clip 3, with the shoe abutting against the foot bearing faces 41 and 21 at the front and rear side-plates 4 and 2, and then the toe strap 5 is used to tighten the shoe.

When the driver is pedalling the bicycle, the pedal body 1 including the spindle 6 and bearing cylinder 14 rotates with respect to the fixed tubular member 8 to thereby revolve the crank arm C.

In this instance, when the pedal is pushed on or raised, the front end of pedal body 1 is directed forward upward or downward. Under such a condition, the pedal body 1, which is shifted downwardly with respect to the common axis of spindle 6 and bearing cylinder 14, tends to restore to its horizontal condition. However, resistance caused by the above restoration is very small to minimize loss of the driving force when treading or raising the pedal, because the foot bearing surfaces 41 and 21 at the front and rear side-plates are substantially level with the common axis of spindle 6 and bearing cylinder 14.

When the pedal revolves, the pedal body 1 is subjected to a greater load. The load is applied one-sidedly to the bearing cylinder 14. Such an unbalanced load, however, is distributed because the bearing cylinder 14 is reinforced by the spindle 6 screwed therewith and is made larger in diameter, and that the second ball race 16 is provided at the larger diameter portion of bearing cylinder 14. Hence, the bearing cylinder 14, spindle 6 or balls 9 and 10, are free from wear or bending caused by the unbalanced load, thereby improving durability of the pedal.

Consequently, the bearing cylinder 14 together with the pedal body 1 can be formed of a light aluminum alloy.

As seen from the aforesaid embodiment, the toe clip 3 is mounted to the pedal body 1 through the three mounting bores 11a to 11c which are arranged in an equilateral triangle-shape on the flat upper surface 11 at the pedal body 1, whereby the larger mounting area keeps the toe clip 3 stable and stress acting thereon is dispersed to the above three points, resulting in an increase in fitting strength.

Furthermore, the toe clip 3, which has the three slots 34a to 34c and is movable longitudinally therealong, is desirably adjustable longitudinally in its mounting position. Also, the toe clip 3 is restricted in widthwise movement, thereby being adjustable in linear movement always keeping its exactly longitudinal direction.

The toe strap 5, which if formed of a thin tape, is made light in weight and also makes use of the detachable fastener 52 to thereby hold tight the driver's shoe at a desired position on the pedal body 1.

In addition, the fastener 52 is formed of a tape-like shape and of conventional synthetic resin. The fastener 52 comprises engaging portions of mushroom-like shape and engaged portions of loop-like shape, both the engaging and engaged portions are mounted in alignment at one lengthwise end of toe strap 5 by means of sticking means.

Figure 6:
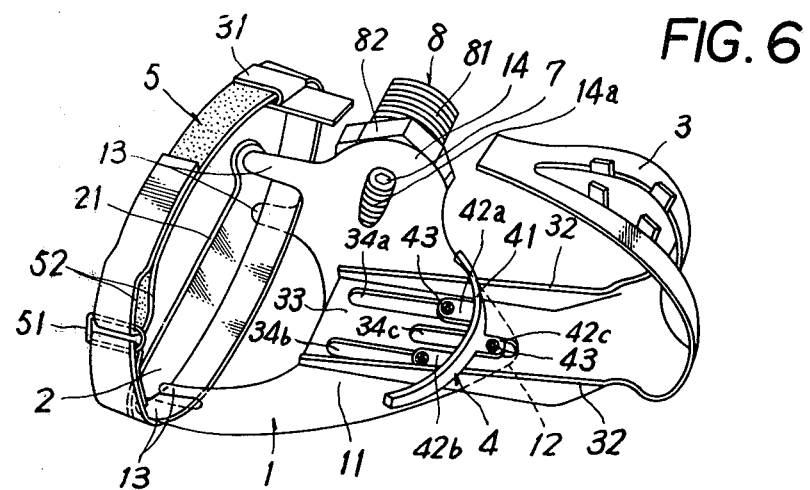
FIG. 6 is a partially omitted perspective view thereof, looking obliquely from the front.
Figure 7:
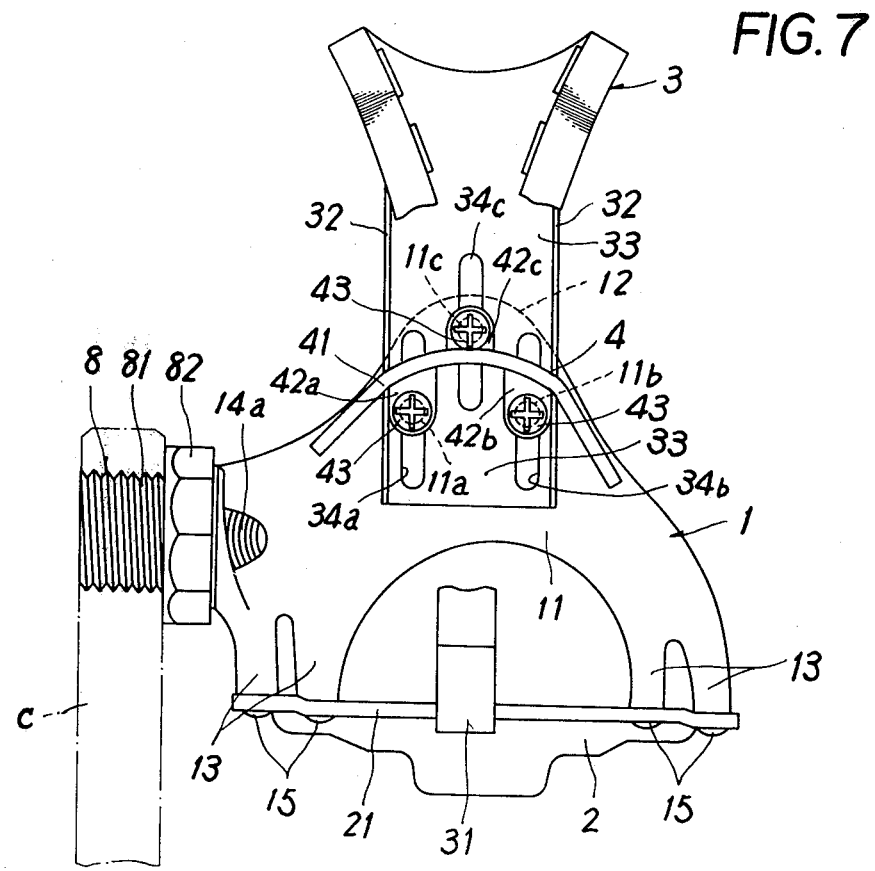
FIG. 7 is a plan view of the pedal in FIG. 6, in which the toe strap is omitted.

In the described embodiment, the front side-plate 4 extends straight widthwise of the pedal body 1, but it may alternately be curved forward along the front edge of triangular-shaped extension 12 at the front of pedal body 1 as shown in FIGS. 6 and 7.

The forward curved front side-plate 4 and the aforesaid formation of the front side of pedal body 1, reduce air resistance against the bicycle's running. Furthermore, the foot bearing surface 41 at the curved front side-plate 4 is longer than with a straight side plate, whereby a larger contact area of the driver's shoe with the surface 41 is attained and the driver is prevented from feeling pain at his foot after long pedalling.

The legs extending rearward from the pedal body 1 are bent inward as shown in FIG. 4 so as to prevent the driver's shoe S from shifting rearward. When the driver raises the pedal for turning the crank arm C, his foot tends to move rearward, so that his shoe S, even when held tight by the toe strap 5, is apt to shift slightly with respect to the pedal body 1. In this instance, the bent legs 13 hold at the inner surfaces thereof the shoe S to prevent its shifting from the pedal body 1, thereby enabling the driver to positively raise the pedal for driving the bicycle.

While preferred embodiments of the invention have been described using specific terms, such description is for illustrative purposes only, and it is to be understood that changes and variations may be made without departing from the spirit or scope of the invention, which is defined in the following claims.

What is claimed is:

1. A pedal for a bicycle, having a pedal body and a bearing mechanism for rotatably supporting said pedal body to a crank arm, the pedal body being equipped with a toe clip and a toe strap, said pedal body being displaced downwardly with respect to an axis of rotation of said bearing mechanism, and having at opposite longitudinal ends a front side-plate and a rear side-plate, each having a respective foot bearing surface, said pedal body having a substantially triangular shaped forward extension extending forwardly of said axis, said extension having an upper surface and a bottom surface which tapers away from said upper surface in a direction of moving away from a fore end of said extension, said bottom surface of said extension being in continuation of and forming part of a bottom surface of said pedal body, said front side-plate being mounted on said extension and being curved forward along the outer edge of said extension.

2. A pedal for a bicycle according to claim 1, wherein said foot bearing surfaces of said side-plates at both longitudinal ends of said pedal body are positioned to be substantially level with the axis of said spindle.

3. A pedal for a bicycle according to claim 1, wherein a flat surface is provided at the upper surface of said pedal body, and at said flat surface are provided mounting bores for said toe clip, said bores being arranged to connect a center of each of said bores in a triangular pattern, said toe clip having a mounting portion extending horizontally, said mounting portion having three elongate slots parallel to each other, so that said toe clip may be mounted to said flat surface at said pedal body in relation of being adjustable at three points in extending direction of each of said slots.

4. A pedal for a bicycle according to claim 1, wherein said pedal body is provided at both widthwise sides of its rear with legs extending rearward thereof, and to said legs is mounted a said rear side-plate having a foot bearing surface.

5. A pedal body for a bicycle according to claim 4, wherein said legs are inclined rearward inwardly to restrain a driver's foot placed on said rear side-plate foot bearing surface from moving rearwards.

6. A pedal body for a bicycle according to claim 1, wherein said toe strap is formed of a thin tape and has at one lengthwise end thereof a ring and at the other end a detachable fastener.

* * * * *